United States Patent Office 3,418,064
Patented Dec. 24, 1968

3,418,064
PROCESS FOR THE DYEING, PADDING AND PRINTING OF TEXTILE MATERIALS WITH ANTHRAQUINONE DYES
Paul Buecheler, Reinach, Basel-Land, Switzerland, assignor to Sandoz Ltd. (also known as Sandoz A.G.), Basel, Switzerland
No Drawing. Filed Apr. 23, 1964, Ser. No. 362,169
Claims priority, application Switzerland, Apr. 23, 1963, 5,094/63; Apr. 8, 1964, 4,470/64
11 Claims. (Cl. 8—39)

This invention relates to a process for the dyeing, padding and printing of textile materials, in particular those consisting wholly or partly of polyacrylonitrile fibers or acrylonitrile copolymer fibers. The process consists in the use of basic dyes of the formula

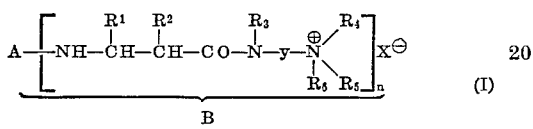

wherein A stands for an anthraquinone radical, $R_1$, $R_2$ and $R_3$ each stands for a hydrogen atom or a substituted or unsubstituted, low-molecular alkyl radical, in particular methyl or ethyl, $R_4$ and $R_5$ each stands for a substituted or unsubstituted alkyl, cycloalkyl or aralkyl radical, $R_6$ for hydrogen, a substituted or unsubstituted alkyl, cycloalkyl or aralkyl radical, y for a divalent bridge member, n for one of the integers 1, 2, 3 or 4, and $X^\ominus$ for an anion equivalent to the dye cation, and in which the B group is in the α-position of the anthraquinone molecule and the radicals $R_4$ and $R_5$ together with the adjacent N atom can form a heterocyclic ring system, or the radicals $R_4$, $R_5$ and $R_6$ together with the adjacent N-atom can form a heterocyclic aromatic ring system. When the anthraquinone radical A, the alkyl radicals $R_1$, $R_2$ and $R_3$ and the alkyl-, cycloalkyl- and aralkyl radicals $R_4$, $R_5$ and $R_6$ are substituted, the substituents are preferably non-water-solubilizing, i.e. not sulfonic acid or carboxyl groups. The anthraquinone radical can be substituted, for example, by a substituted or unsubstituted amino group or by chlorine, bromine, nitro, cyan, or by substituted or unsubstituted alkyl, alkoxy, phenoxy, mercapto or carbonamide. Preferred dyes of Formula I are those in which each of the radicals $R_1$ and $R_2$ contains a hydrogen atom or either $R_1$ or $R_2$ represents a hydrogen atom while the other represents the methyl group.

The radicals $R_4$, $R_5$ and $R_6$—when $R_6$ does not stand for a hydrogen atom—represent substituted or unsubstituted alkyl radicals such as methyl, ethyl, propyl or butyl radicals, cycloalkyl radicals such as a cyclohexyl radical, or aralkyl radicals such as a benzyl radical. When these radicals $R_4$, $R_5$ and $R_6$ are substituted, they contain in particular a hydroxyl group, a halogen atom such as a chlorine, bromine or fluorine atom, or a cyan group, etc. The radicals $R_4$ and $R_5$ can form together with the adjacent N atom a heterocyclic ring system, e.g. a pyrrolidine, piperidine, morpholine, piperazine, or ethyleneimino grouping. Alternatively, the radicals $R_4$, $R_5$ and $R_6$ can together form a heterocyclic ring system, e.g. a grouping of the formula

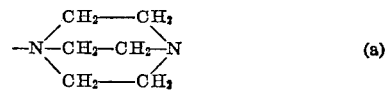   (a)

or they can stand for pyridine radicals, in which case one or the radicals $R_4$, $R_5$ or $R_6$ is a π-electron.

The radicals $R_4$, $R_5$ and $R_6$ can also stand for a grouping of the formula

   (b)

where the quaternary N atom together with the radical Z forms an unsaturated ring.

The divalent bridge member y is preferably a hydrocarbon radical, e.g. a substituted or unsubstituted methylene or phenylene group, and a divalent and a trivalent organic radical bound through the cited methylene or phenylene group to the adjacent secondary or ternary N-atom, e.g. an alkylene radical which may be interrupted by hereto atoms such as nitrogen-, sulfur- or oxygen atoms, or alternatively it may be a substituted or unsubstituted alkenyl, phenylene, alkylene-phenylene or alkylenephenylenealkylene radical, etc. Examples of these bridge members are: —$(CH_2)_p$— where p represents an integer from 1 to 6,

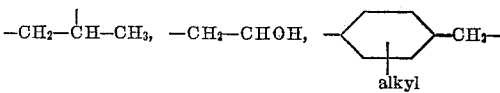

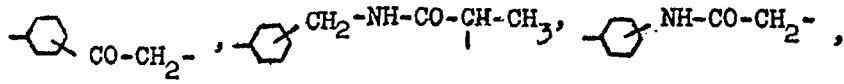

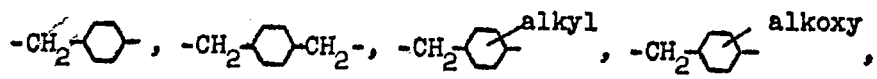

The anion $X^{\ominus}$ can be either an organic or inorganic anion, e.g. hydroxyl, methyl sulfate, ethyl sulfate, sulfate, disulfate, perchlorate, chloride, bromide, iodide, phosphorus molybdate, benzenesulfonate, oxalate or maleinate ions.

The dyes of Formula I are employed for dyeing, padding and printing textile materials, in particular textile materials made of polyacrylonitrile fibers composed to more than 80% of acrylonitrile and acrylonitrile copolymer fibers composed of 80–95% acrylonitrile and 20–5% vinyl acetate, vinyl pyridine, vinyl chloride, vinyl alcohol, acrylic acid, acrylic acid ester, methacrylic acid, methacrylic acid ester, methacrylate or methylmethycrylate. This class of fibers include "Acrilan," a copolymer of 85% acrylonitrile and 15% vinyl acetate or vinyl pyridine (of the firm "The Chemstrand Corporation, Decatur, Alabama, U.S.A.) "Orlon," "Dralon," "Courtelle," "Crylor," "Dynel," "Acrybel," "Daryl," "Daran," "Dolan," "Ducilon," "Exlan," "Imelon," "Kanekalon," "Nitrolon," "Nyma 212," "Nymcrylon," "Nymerlon," "Panacryl," "Polacryl," "Prelana," "Redon," "Rolan," Sniacryl," "Tacryl," "Vezel N," "Wolcrylon," etc., which for the most part are registered trademarks.

The dyes of Formula I are also suitable for dyeing, padding and printin polyester and polyolefin modified by the introduction of acid groups.

Polyacrylonitrile fibers can be dyed, padded or printed in blends with other fibers.

Level dyeings and prints of good depth are obtained which have good fastness to light, and wet treatments such as washing, water, milling, perspiration, sea water and bleaching, and to pleating, ironing, rubbing and heat.

The dyes are best applied from aqueous medium. It is advisable to work in a neutral or acid medium at a pH value of 2 to 10, preferably 5 to 7, and at temperatures of 60° to 100° C., or preferably at the boil. The dyes can of course be applied in pressure dyeing equipment at elevated temperature, e.g. 102–120° C.

The dyeing procedure is as follows. A basic dye or a mixture of basic dyes of Formula I is intimately ground with e.g., dextrin, common salt, sodium sulfate or sugar in a ball mill. The resulting preparation is pasted with acetic, formic, sulfuric or phosphoric acid or ammonium sulfate, water at about 20–80° C. added to the paste with vigorous stirring, and the whole boiled for a short time. It is then diluted with water to a suitable liquor ratio between 1:1 to 1:200, preferably from 1:3 to 1:100, more acid added as required, e.g. glacial acetic or formic acid, and also a salt of a strong base and a weak acid, e.g. sodium acetate, sodium formate, potassium formate, potassium formate, oxalate. The textile material of polyacrylonitrile or acrylonitrile copolymer fiber is entered into the dyebath at about 60°. It is raised to 100° C. in 30 minutes and maintained at the boil for about 1 hour. Subsequently the goods are rinsed. The polyacrylonitrile or acrylonitrile copolymer fiber material can be treated before dyeing in an acetic acid or formic acid bath for about 10–15 minutes at 60°.

The dyes of Formulas II and V, preferably those of Formula II can be applied to the aforenamed fibers from aqueous dispersion. It is desirable for the dye dispersion to contain a nonionic dispersing agent, e.g. phenyl- or alkylphenyl-polyglycol ethers or the polyglycol ethers of higher alcohols.

The dyed, padded or printed textile materials can be submitted to a heat treatment, e.g. exposure in a steam atmosphere or in a dry air atmosphere at a temperature above 100° C., or they can be aftertreated with acids, aldehydes, e.g. formaldehyde, oxidizing and/or anionic agents (softeners, antistatic agents etc.).

The process is suitable for producing dyeings and prints of all depths up to the saturation of the fiber. For this purpose it is best to employ 0.005 to 20%, or preferably 0.5 to 10% dye, calculated on the weight of the goods.

The dyebaths can be prepared with the assistants in general use, e.g. levelling agents, optical brightening agents, salts, e.g. common or Glauber's salt, wetting agents, and solvents, such as nonionic products of the alkyl- or aryl-polyglycol ether type in amounts of 0.05–10% on the weight of the material.

The aforementioned textile materials can be printed by the conventional methods. In printing application as in dyeing, shades of all depths can be produced, using, for example, 0.01 to 100 parts of dye, or preferably 5 to 40 parts, per 1000 parts of print paste. The commonly used printing assistants can be included in the paste, e.g. solvents for dyes such as urea, thiodiethylene glycol, butyl carbitol, glycerine or nonionic products of the alkyl-, aralkyl- or aryl-polyglycol ether type, thickening, optical brightening, levelling and wetting agents. Suitable thickening agents include gum traganth, locust bean gum and its derivatives, sodium alginate, starches and starch derivatives.

In pad application the dye are applied to the polyacrylonitrile or acrylonitrile copolymer fiber material on a two- or three-bowl padding machine, on which the material is expressed to retain 40 to 180% or preferably 60 to 80% of its weight of liquor. The padded dye can be fixed by steaming, dry heat treatment or storage at room temperature according to whether the pad-steam, thermofixation or pad-roll process is used. Fixing temperatures higher than 200° C. are not advisable.

In the following, two modes of operation for the production of the dyes of the present process are set forth.

The first mode of operation is employed for the production of dyes of the anthraquinone series having the formula

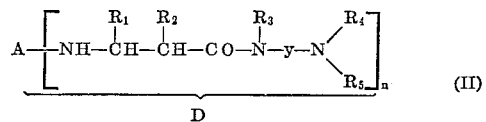

$$\underbrace{A \left[ -NH-\underset{R_1}{\overset{|}{C}H}-\underset{R_2}{\overset{|}{C}H}-CO-\underset{|}{\overset{R_3}{N}}-y-N\underset{R_5}{\overset{R_4}{\diagdown}} \right]_n}_{D} \quad (II)$$

wherein A represents an anthraquinone radical, $R_1$, $R_2$ and $R_3$ each represents a hydrogen atom or a substituted or unsubstituted low-molecular alkyl radical, $R_4$ and $R_5$ each represents a substituted or unsubstituted alkyl, cycloalkyl or aralkyl radical, y represents a divalent bridge member and n one of the integers 1, 2, 3 or 4, and in which the D group is in the α-position of the anthraquinone molecule and the radicals $R_4$ and $R_5$ together with the adjacent N atom can form a heterocyclic ring system. This mode of operation comprises the reaction of a carboxylic acid or a functional derivative of a carboxylic acid having the formula

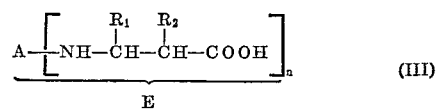

$$\underbrace{A \left[ -NH-\underset{R_1}{\overset{|}{C}H}-\underset{R_2}{\overset{|}{C}H}-COOH \right]_n}_{E} \quad (III)$$

in which the E group is in the α-position of the anthraquinone molecule, with an amine of the formula

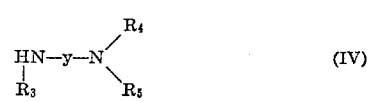

$$HN-y-N\underset{R_5}{\overset{R_4}{\diagdown}} \quad (IV)$$
$$\overset{|}{R_3}$$

The carboxyalkylaminoanthraquinone of Formula III is reacted with an amine of Formula IV preferably in the presence of an inorganic acid halide, in particular the chloride of an inorganic acid or phosphorus pentachloride.

The carboxyalkylaminoanthraquinones of Formula III used as starting products can be prepared, for example, as disclosed in Swiss Patent 357,129 by reaction of anthraquinone compounds containing amino groups in the α-positions with acrylic, methacrylic or crotonic acid, or by reaction with their amides, esters or nitriles, followed by saponification.

The carboxyalkylaminoanthraquinone and the amine of Formula IV can be suspended or dissolved in an inert organic solvent, and an inorganic acid chloride, preferably phosphorus trichloride or phosphorus pentachloride, added at 0–50° C. It is advantageous to use an excess of the amine, or additionally to the amount of amine required for the reaction a quantity of a tertiary base, e.g. pyridine, trimethylamine or dimethylaniline, sufficient to bind all the acid liberated during the reaction, i.e. at least 1 equivalent of the amine of Formula IV and 1 equivalent of the tertiary base or at least 2 equivalents of the amine of Formula IV calculated on the acid equivalents of the compound of Formula III to be condensed. Condensation of the carboxyalkylaminoanthraquinone of Formula III with the amine of Formula IV is effected at about 0° to 100° C.

Examples of suitable inert organic solvents are petroleum ether and other liquid aliphatic hydrocarbons such as methyl chloride, chloroform, carbon tetrachloride, dichloroethane; halogenated, particularly chlorinated, aliphatic hydrocarbons; aromatic hydrocarbons; halogenated aromatic solvents such as benzene, toluene, chlorobenzene; nitrated aromatic solvents such as nitrobenzene, dioxan, and other cyclic or aliphatic ethers, e.g. diethyl ether.

Thionyl chloride, phosphorus trichloride and phosphorus oxychloride are named as specially suitable inorganic acid chlorides. Phosphorus pentachloride, phosphorus tribromide and phosphorus pentabromide are also well suitable.

Examples of suitable amines of Formula IV are primary and secondary amines of the alkylene and alkenyldiamine series having 1 to 6 carbon atoms, for instance 1-amino-3 - N,N - dimethylaminopropane, 4 - N,N-dimethylaminophenylamine, N-aminoethylpiperazine, diethylaminoethylamine, 4-N,N-dimethylaminobenzylamine, N-aminopropylmorpholine, diethylaminopropylamine, dibutylaminopropylamine, diethylaminobutylamine, i.e. in general dialkylaminoalkylamines whose alkyl radicals may be further substituted, and in addition N-aminoalkylpiperazine, N-aminoalkylmorpholine, N-aminoalkylpyrrolidine, N,N-dialkylaminobenzylamine, etc. The dyes of Formula I are isolated by the standard methods, i.e. filtration, precipitation from solution, or evaporation of the solvent in water vapor.

The dyes of Formula II which are free from carboxylic acid and sulfonic acid groups are valuable products and can be converted into the dye salts of Formula I with acids.

The second mode of operation is employed for the production of dyes of the anthraquinone series having the formula

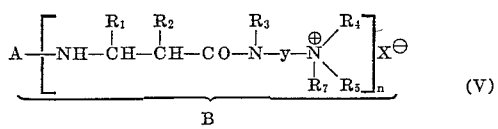

wherein $R_1$, $R_2$ and $R_3$ each represents a hydrogen atom or a substituted or unsubstituted low-molecular alkyl radical, $R_4$, $R_5$ and $R_7$ each represents a substituted or unsubstituted alkyl, cycloalkyl or aralkyl radical, $y$ represents a divalent bridge member, $n$ one of the integers 1, 2, 3 or 4, and $X^\ominus$ an anion equivalent to the dye cation, and in which the B group is in the α position of the anthraquinone molecule and the radicals $R_4$ and $R_5$ together with the adjacent N atom can form a heterocyclic ring system, or the radicals $R_4$, $R_5$ and $R_7$ together with the adjacent N-atom can form a heterocyclic aromatic ring system. This mode of operation of the process consists in the quaternation of a compound of formula

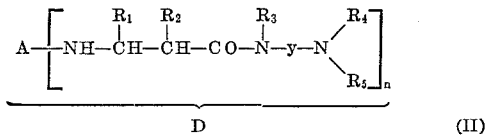

Quaternation to convert compounds of Formula II into the dye salts of Formula I is performed preferably in an inert solvent or, if suitable, in aqueous suspension, or without solvent in an excess of the quaternating agent. The reaction medium is buffered if necessary and is maintained at an elevated temperature.

Suitable quaternating agents (the reaction can be described as an exhaustive alkylation and hence these can be termed alkylating agents) are alkyl chlorides, alkyl bromides, alkyl iodides, aralkyl halides such as methyl chloride, methyl bromide, methyl iodide, the esters of strong mineral acids or organic sulfonic acids, the α-halogenated esters of low-molecular alkanesulfonic acid, e.g. dimethyl sulfate, diethyl sulfate, methane-, ethane- and butane-sulfonic acids, the esters of benzenesulfonic acids which may be further substituted such as their methyl, ethyl, propyl and n-butyl esters, 2- or 4-methylbenzenesulfonic acid, 4-chlorobenzenesulfonic acid, 3- or 4-nitrobenzenesulfonic acid, the methyl esters of low-molecular alkanesulfonic acids and benzenesulfonic acids.

In the following examples the parts and percentages are by weight and the temperatures in degrees centigrade.

EXAMPLE 1

20 parts of 1-(2′-carboxyethylamino)-4-hydroxyanthraquinone are suspended in 150 parts of toluene containing 30 parts of 3-N,N-dimethylaminopropylamine in solution. 7 parts of phosphorus trichloride are added at 40°, causing a temperature increase to 90°. When the reaction has run its course the precipitated crystalline hydrochloride of the dye is filtered off and washed with toluene.

To isolate the dye base, the hydrochloride is dissolved in 500 parts of boiling water and 15 parts of a 25% aqueous ammonia solution are added to the solution. On cooling, the dye is filtered off, washed with water and vacuum dried at 60°. It dyes polyacrylonitrile fibers in violet shades which have excellent light fastness and good wet fastness properties.

EXAMPLE 2

15 parts of 1-(2′-carboxyethylamino)-4-phenylaminoanthraquinone are suspended in a solution of 100 parts of dioxan and 30 parts of 3-N,N-dimethylaminopropylamine. After stirring at 20–25° for 2 hours, 4.8 parts of phosphorus trichloride are slowly dropped in, upon which the temperature rises to 50°. In the course of 30 minutes the reaction mixture is brought to 80° and is stirred for 1 hour at this temperature. It is then cooled to room temperature and 200 parts of 30% ethyl alcohol are added dropwise. After a further hour the reaction mixture is run into 1000 parts of water, to which 40 parts of a 25% aqueous ammonia solution and 200 parts of sodium chloride are added. The oily precipitated dye assumes a crystalline form after it has been stirred for 1 hour at room temperature in the medium containing these additions. It is filtered off, washed with water and dried in vacuum at 40°. The dye obtained dyes polyacrylonitrile fibers in blue shades which have excellent fastness properties.

EXAMPLE 3

15 parts of 1-(2'-carboxyethylamino)-anthraquinone are added to a solution of 100 parts of dioxan and 25 parts of 3-N,N-dimethylaminopropylamine, and stirred for 2 hours at room temperature. After a further hour, 16 parts of phosphorus trichloride are added dropwise, which causes a slow increase in temperature to 80°. When no further starting material is indicated, the mixture is poured into 1000 parts of water containing 200 parts of a 25% aqueous ammonia solution. The oily precipitated dye takes on crystalline form following the addition of 200 parts of sodium chloride, and after stirring for 1 hour it is ready for filtering. It is washed with water and vacuum dried at 40°.

The dye obtained in this way dyes polyacrylonitrile fibers in level red shades having excellent fastness properties.

Further valuable dyes wnich can be produced in accordance with the procedures set forth in Examples 1 to 3 are listed in Table 1 below. They have the formula

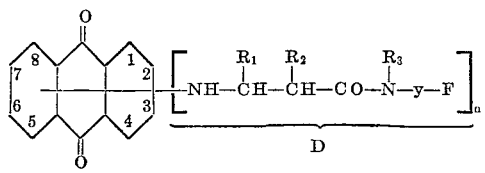

in which $R_1$, $R_2$, $R_3$, D, F, y and n have the meanings assigned to them in the table. The anion $X^{\ominus}$ can be any one of those named in the preceding description of the process (see Formula I). The symbol F represents one of the radicals $F_1$ to $F_{13}$ in the following Table A.

TABLE A

| | |
|---|---|
| $F_1$ the radical | —N(CH$_3$)$_2$ |
| $F_2$ the radical | —N(C$_2$H$_5$)$_2$ |
| $F_3$ the radical | —N(CH$_3$)(C$_2$H$_5$) |
| $F_4$ the radical | —N(C$_2$H$_4$OH)$_2$ |
| $F_5$ the radical | piperidino (—N⟨CH$_2$⟩ ring with H) |
| $F_6$ the radical | piperazino (—N⟨ ⟩N— with H) |
| $F_7$ the radical | morpholino (—N⟨ ⟩O with H) |
| $F_8$ the radical | pyrrolidino (—N⟨ ⟩ with H) |
| $F_9$ the radical | —N(C$_3$H$_7$)$_2$ |
| $F_{10}$ | —N(C$_4$H$_9$)$_2$ |
| $F_{11}$ | —N⟨N=CH, CH=N⟩ |
| $F_{12}$ the radical | —N(CH$_2$—CH$_2$—Cl)$_2$ |
| $F_{13}$ the radical | —N(CH$_2$—CH$_2$—CN)$_2$ |

In each of the dyes listed in Table 1 the F radical designated therein can be replaced by any other F radical. Thus, where $F_1$ is given in a tabulated example its place can be taken equally as well by one of the radicals $F_2$ to $F_{13}$.

TABLE 1

Substituents in the 1 to 8 positions of the anthraquinone molecule including substituent D

| Example No. | $R_1$ | $R_2$ | $R_3$ | F | 1 | 2 | 3 | 4 | 5 | 6 | 7 | 8 | y | n | Shade of dyeing on Orlon |
|---|---|---|---|---|---|---|---|---|---|---|---|---|---|---|---|
| 4 | H | H | H | $F_1$ | D | H | | NHCH$_3$ | H | H | H | H | —C$_6$H$_4$— | 1 | Blue. |
| 5 | H | H | H | $F_6$ | D | CH$_3$ | | NH—C$_6$H$_5$ | H | H | H | H | —CH$_2$—CH$_2$— | 1 | Do. |
| 6 | H | H | H | $F_2$ | D | OCH$_3$ | | NH—C$_6$H$_4$—OCH$_3$ | H | H | H | H | —CH$_2$—CH$_2$— | 1 | Do. |
| 7 | H | H | H | $F_4$ | D | H | | OH | H | H | H | OH | —C$_6$H$_4$— | 2 | Greenish blue. |
| 8 | H | H | H | $F_7$ | D | H | | OH | OH | H | H | DH | —CH$_2$—CH$_2$—CH$_2$— | 2 | Green-blue. |
| 9 | H | H | H | $F_7$ | D | H | | OH | D | H | H | H | —CH$_2$—CH$_2$—CH$_2$— | 2 | Blue. |
| 10 | H | H | H | $F_2$ | NH$_2$ | H | | OH | OH | H | H | OH | —CH$_2$—CH$_2$—CH$_2$— | 1 | Do. |
| 11 | H | H | H | $F_5$ | D | —C$_6$H$_4$—OCH$_3$ | | OH | D | H | H | D | —CH$_2$—CH$_2$—CH$_2$— | 4 | Blue-green. |
| 12 | H | H | H | $F_2$ | D | —O—C$_6$H$_5$ | | OH | H | H | H | H | —CH$_2$—CH$_2$—CH$_2$— | 1 | Red-violet. |

TABLE 1—Continued

| Example No. | $R_1$ | $R_2$ | $R_3$ | F | \multicolumn{8}{c|}{Substituents in the 1 to 8 positions of the anthraquinone molecule including substituent D} | y | n | Shade of dyeing on Orlon |
| --- | --- | --- | --- | --- | --- | --- | --- | --- | --- | --- | --- | --- | --- | --- | --- |
| | | | | | 1 | 2 | 3 | 4 | 5 | 6 | 7 | 8 | | | |
| 13 | H | H | H | $F_{10}$ | D | —O—C₆H₄—CH₃ | —O—C₆H₄—CH₃ | NH₂ | H | H | H | H | —CH₂—CH₂—CH₂— | 1 | Do. |
| 14 | H | H | H | $F_2$ | D | Cl | Cl | NH₂ | H | H | H | H | —CH₂—CH₂—CH₂—CH₂— | 1 | Blue-violet. |
| 15 | H | H | H | $F_{11}$ | D | H | H | H | H | Cl | Cl | H | —CH₂—CH₂—CH₂— | 1 | Red. |
| 16 | CH₃ | H | H | $F_1$ | D | H | H | NH₂ | H | H | H | H | —CH₂—CH₂—CH₂— | 1 | Blue-green. |
| 17 | H | CH₃ | H | $F_2$ | D | H | H | NH₂ | H | H | H | H | —CH₂—CH₂—CH₂— | 1 | Blue. |
| 18 | CH₃ | CH₃ | H | $F_{12}$ | D | CH₃ | H | H | H | H | H | H | —(CH₂)₄— | 1 | Red. |
| 19 | H | H | H | $F_1$ | D | H | H | —S—C₆H₅ | H | H | H | H | —(CH₂)₃— | 1 | Violet. |
| 20 | H | H | H | $F_2$ | D | H | H | —S—C(=N)(benzothiazole) | H | H | H | H | —(CH₂)₃— | 1 | Red-violet. |
| 21 | H | H | CH₃ | $F_{13}$ | D | Br | Br | Br | H | H | H | H | —(CH₂)₃— | 1 | Red. |
| 22 | H | H | H | $F_6$ | D | H | H | D | H | H | H | H | —(CH₂)₄— | 3 | Blue-green. |
| 23 | H | CH₃ | H | $F_7$ | D | S—CH₃ | H | D | H | H | H | H | —(CH₂)₃— | 2 | Do. |
| 24 | H | H | H | $F_3$ | D | S—C₆H₅ | H | OH | H | H | H | H | —(CH₂)₂— | 1 | Blue. |
| 25 | H | H | H | $F_5$ | D | S—C₆H₅ | C₆H₅ | NH₂ | H | H | H | H | —(CH₂)₃— | 1 | Blue-green. |
| 26 | H | H | H | $F_8$ | D | H | NO₂ | OH | H | H | H | H | —(CH₂)₄— | 1 | Blue. |
| 27 | H | H | H | $F_9$ | D | CN | H | NH₂ | H | H | H | H | —CH₂—C₆H₄— | 1 | Blue-green. |
| 28 | H | H | H | $F_9$ | D | CN | CN | D | H | H | H | H | —CH₂—C₆H₄— | 2 | Do. |
| 29 | CH₃ | H | CH₃ | $F_{10}$ | D | OC₂H₅ | OC₂H₅ | OH | H | H | H | H | —CH₂—CH₂—CH₂— | 1 | Blue-violet. |
| 30 | CH₃ | CH₃ | H | $F_1$ | D | —SCH₃ | S—CH₃ | D | H | H | H | H | —(CH₂)₄— | 2 | Blue-green. |
| 31 | H | H | H | $F_1$ | D | —CONH₂ | H | D | H | H | H | H | —(CH₂)₃— | 2 | Do. |
| 32 | CH₃ | CH₃ | H | $F_7$ | D | \multicolumn{2}{c|}{2 and 3 positions together —CO—NH—CO—} | OH | H | H | H | H | —(CH₂)₃— | 1 | Do. |
| 33 | H | H | C₄H₉ | $F_3$ | D | \multicolumn{2}{c|}{—CO—NH—CO—} | D | H | H | H | H | —(CH₂)₃— | 2 | Do. |
| 34 | H | H | H | $F_4$ | D | H | NO₂ | NH₂ | H | H | H | H | —CH₂—C₆H₄—CH₂— | 1 | Green. |

EXAMPLE 35

A solution of 39.5 parts of the dye of Example 1 in 400 parts of chlorobenzene is heated at 60° and in the course of 1 hour 14 parts of dimethyl sulfate are added dropwise. The reaction mixture is held at 60° for a further 2 hours, then cooled to room temperature, upon which the precipitated dye salt is filtered off, washed with chlorobenzene and dried.

On polyacrylonitrile fiber fabrics the dye gives violet dyeings that have good fastness properties.

EXAMPLE 36

A solution of 37.7 parts of the dye of Example 2 in 400 parts of chlorobenzene is heated at 60°. In the course of 1 hour 18 parts of ethyl iodide are added dropwise, after which stirring is continued at 60° until no more starting material is indicated. The dye is filtered off, washed wth chlorobenzene and dried.

Level red dyeings of good fastness are obtained on polyacrylonitrile materials with the dye of this example.

Further valuable dyes which can be produced by the procedures given in Examples 35 and 36 are set forth in Table 2 below. These dyes have the formula

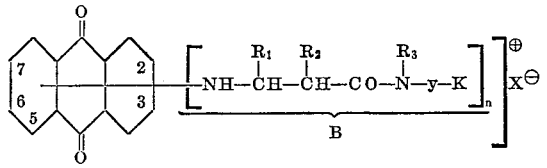

in which $R_1$, $R_2$, $R_3$, B, K, $y$ and $n$ have the meanings assigned to them in Table 2. The anion $X^\ominus$ can be any of those named in the description of the process. K stands for one of the radicals $K_1$ to $K_{13}$ in Table B below.

TABLE B $K_1$ the radical — $[-N(CH_3)_3]^\oplus X^\ominus$ $K_2$ the radical — $[-N(C_2H_5)_3]^\oplus X^\ominus$ $K_3$ the radical — $\begin{bmatrix} CH_3 \\ | \\ -N(C_2H_5)_2 \end{bmatrix}^\oplus X^\ominus$ $K_4$ the radical — $[-N(C_2H_4OH)_3]^\oplus X^\ominus$ $K_5$ the radical — $\begin{bmatrix} CH_3 \\ | \\ -N(C_2H_4OH)_2 \end{bmatrix}^\oplus X^\ominus$ $K_6$ the radical — piperazinium $]^\oplus X^\ominus$ $K_7$ the radical — pyridinium $]^\oplus X^\ominus$ $K_8$ the radical — (N-methylpyridinium with H) $]^\oplus X^\ominus$ $K_9$ the radical — (N-methylpyridinium with H) $]^\oplus X^\ominus$ $K_{10}$ the radical — (N-methylmorpholinium with H, O) $]^\oplus X^\ominus$ $K_{11}$ the radical — $\begin{bmatrix} C_2H_4OH \\ | \\ -N(CH_3)_2 \end{bmatrix}^\oplus X^\ominus$ $K_{12}$ the radical — $\begin{bmatrix} CH_3 \\ | \\ -N-C_2H_4OH \\ | \\ C_2H_5 \end{bmatrix}^\oplus X^\ominus$ $K_{13}$ the radical — $\begin{bmatrix} C_2H_5 \\ | \\ -N(CH_3)_2 \end{bmatrix}^\oplus X^\ominus$ As in Table 1, the K radical in the dyes enumerated in Table 2 can in each instance be replaced by any other K radical. For example, where the radical $K_1$ is given in a tabulated example its place can be taken equally as well by one of the radicals $K_2$ to $K_{13}$.

TABLE 2

| Example No. | $R_1$ | $R_2$ | $R_3$ | F | Substituents in the 1 to 8 positions of the anthraquinone molecule including substituent B | | | | | | | | $y$ | $n$ | Shade of dyeing on Orlon |
|---|---|---|---|---|---|---|---|---|---|---|---|---|---|---|---|
| | | | | | 1 | 2 | 3 | 4 | 5 | 6 | 7 | 8 | | | |
| 37 | H | H | H | $K_1$ | B | H | H | $NHCH_3$ | H | H | H | H | –C$_6$H$_5$ | 1 | Blue. |
| 38 | H | H | H | $K_3$ | B | $CH_3$ | H | $NH$–C$_6$H$_5$ | H | H | H | H | –$CH_2$–$CH_2$– | 1 | Do. |
| 39 | H | H | H | $K_5$ | B | $OCH_3$ | H | $NH$–C$_6$H$_4$–$OCH_3$ | H | H | H | H | –$CH_2$–$CH_2$– | 1 | Do. |
| 40 | H | H | H | $K_6$ | B | H | H | OH | B | H | H | B | –$CH_2$–C$_6$H$_4$– | 2 | Greenish blue. |
| 41/42 | H | H | H | $K_9/K_{10}$ | BB | HH | HH | OH OH/B | OH/OH | HH | HH | BB/OH | –$CH_2$–$CH_2$–/–$CH_2$–$CH_2$– | 2/2 | Green-blue./Blue. |
| 43 | H | H | H | $K_4$ | $NH_2$ | H | H | OH | B | H | H | OH | –$CH_2$–$CH_2$– | 1 | Do. |
| 44 | H | H | H | $K_{13}$ | B | H | H | B–O–$CH_3$ (aryl) | B | H | H | B | –$CH_2$–$CH_2$– | 4 | Blue-green. |

TABLE 2—Continued

| Example No. | $R_1$ | $R_2$ | $R_3$ | F | \multicolumn{8}{c|}{Substituents in the 1 to 8 positions of the anthraquinone molecule including substituent D} | $y$ | $n$ | Shade of dyeing on Orlon |
|---|---|---|---|---|---|---|---|---|---|---|---|---|---|---|---|
| | | | | | 1 | 2 | 3 | 4 | 5 | 6 | 7 | 8 | | | |
| 45 | H | H | H | $K_{12}$ | B | —O—C₆H₅ | H | OH | H | H | H | H | —CH₂—CH₂—CH₂— | 1 | Red-violet. |
| 46 | H | H | H | $K_7$ | B | —O—C₆H₄—CH₃ | —O—C₆H₄—CH₃ | NH₂ | H | H | H | H | —CH₂—CH₂—CH₂— | 1 | Do. |
| 47, 48 | H, CH₃ | H, H | H, H | $K_8$, $K_{11}$ | B, B | Cl, H | Cl, H | NH₂, H | H, H | H, Cl | H, Cl | H, H | —CH₂—CH₂—CH₂—CH₂—, —(CH₂)₂— | 1, 1 | Blue-violet. Red. |
| 49 | CH₃ | H | H | $K_{10}$ | B | H | H | NHC₆H₅ | H | H | H | H | —(CH₂)₃— | 1 | Blue-green. |
| 50, 51 | H, H | CH₃, CH₃ | H, H | $K_9$, $K_2$ | B, B | H, CH₃ | H, H | NH₂—C₆H₅, H | H, H | H, H | H, H | H, H | —(CH₂)₃—, —(CH₂)₄— | 1, 1 | Blue. Red. |
| 52 | H | H | H | $K_1$ | B | H | H | —S—(benzothiazolyl) | H | H | H | H | —(CH₂)₃— | 1 | Violet. |
| 53 | H | H | CH₃ | $K_3$ | B | H | H | —S—(benzothiazolyl) | H | H | H | H | —(CH₂)₃— | 1 | Red-violet. |
| 54 | H | H | H | $K_5$ | B | Br | H | Br | H | H | H | H | —CH₂—C₆H₄—CH₂— | 1 | Red. |
| 55, 56 | H, H | H, S—CH₃ | H, H | $K_7$, $K_8$ | B, B | H, H | H, H | B, B | B, H | H, H | H, H | H, H | —(CH₂)₄—, —(CH₂)₂— | 3, 2 | Blue-green. Do. |
| 57 | H | H | H | $K_6$ | B | —S—C₆H₅ | —S—C₆H₅ | OH | H | H | H | H | —(CH₂)₂— | 1 | Blue. |
| 58 | H | H | H | $K_4$ | B | —S—C₆H₅ | NO₂ | NH₂ | H | H | H | H | —(CH₂)₃— | 1 | Blue-green. |
| 59 | H | H | H | $K_{10}$ | B | H | H | OH | H | H | H | H | —(CH₂)₄— | 1 | Blue. |
| 60 | H | H | H | $K_{11}$ | B | CN | CN | NH₂ | H | H | H | H | —CH₂—C₆H₄—CH₂— | 1 | Blue-green. |
| 61 | H | H | H | $K_{13}$ | B | CN | CN | B | H | H | H | H | —CH₂—C₆H₄—CH₂— | 2 | Do. |
| 62, 63, 64 | H, CH₃, H | H, H, CH₃ | H, H, H | $K_9$, $K_{12}$, $K_1$ | B, B, B | OC₂H₅, —SCH₃, CONH₂ | OC₂H₅, —SCH₃, H | 2 and 3 positions together —CO—NH—CO—, —CO—NH—CO— | H, H, H | H, H, H | H, H, H | H, H, H | —(CH₂)₃—, —(CH₂)₄—, —(CH₂)₃— | 1, 2, 2 | Blue-violet. Blue-green. Do |
| 65, 66 | CH₃, CH₃ | CH₃, H | H, C₄H₉ | $K_4$, $K_7$ | B, B | H | H | OH, B | H, H | H, H | H, H | H, H | —(CH₂)₂—, —(CH₂)₃— | 1, 2 | Do. Do. |
| 67 | H | H | H | $K_{10}$ | B | H | NO₂ | NH₂ | H | H | H | H | —CH₂—C₆H₄—CH₂— | 1 | Green. |

Dyeing example A 1 part of the dye obtained by the procedure of Example 2, 1 part of an alkylphenylglycol ether, e.g. isooctylphenyloctaglycol ether, and 18 parts of water are ground to a fine dispersion, which is run into 800 parts of distilled water containing 1.5 parts of glacial acetic acid, 3 parts of sodium acetate and 5 parts of calcined sodium sulfate. This dyebath is heated to 60° and 100 parts of a fabric of polyacrylonitrile fiber, e.g. "Orlon," are entered. The bath is brought to the boil in 30 minutes and held at the boil for 1½ hours, the water lost by evaporation being replaced at 15-minute intervals by boiling distilled water. The dyed fabric is then removed, rinsed with warm and cold water, and dried. It is dyed to a bright blue shade which shows excellent fastness to light, washing, perspiration, pressing and heat setting, and is stable to acids and alkalis.

The dye of Example 2 used in the present example can be replaced by any of the dyes of the tabulated Examples 4 to 34 and 37 to 67, or by those of Examples 35 and 36.

Dyeing example B 20 parts of the dye obtained according to Example 1 and 80 parts of dextrin are intimately mixed in a ball mill for 48 hours. 1 part of the mixture is pasted with 1 part of glacial acetic acid 40%, 400 parts of distilled water at 60° are poured over the paste with vigorous stirring, and after boiling for a short time the solution is added to 7600 parts of distilled water, with the subsequent addition of 2 parts of glacial acetic acid. 100 parts of "Dralon" (registered trade mark) are entered into this dyebath at 60°, after a preliminary treatment of 10 to 15 minutes in a bath of 8000 parts of water and 2 parts of glacial acetic acid at 60°. The dyebath is raised to 100° in 30 minutes and the goods dyed at this temperature for 1 hour, then rinsed and dried. A level violet dyeing is obtained which has excellent light fastness and very good wet fastness properties.

Pad dyeing example C

A padding liquor is prepared with the following additions per 1000 parts: 50 parts of the dyeing preparation made as described in dyeing example B, 3 parts of sodium alginate, 5 parts of concentrated acetic acid and 20 parts of calcined sodium sulfate. The liquor is applied to a fabric of polyacrylonitrile fiber at room temperature on a padding machine with two or three bowls, expressed to a pick-up of 80% and dried at 90° on tenters, a hot flue or with infrared radiation. The pad dyeing is then fixed on tenters by exposure for 1 to 3 minutes in dry air at 170-190°. The fabric is rinsed, soaped, rinsed again and dried. A violet dyeing is obtained which has excellent light fastness.

Printing example D

A printing paste is prepared with:

| | Parts |
|---|---|
| Dyeing preparation as given in dyeing example B | 75 |
| Cationic softener, e.g. the condensation product of equimolar amounts of stearic acid and triethanolamine | 450 |
| Calcined sodium sulfate | 25 |
| Water | 415 |
| | 1000 |

The paste is printed on polyacrylonitrile fiber fabric by the block printing process, the fabric air-dried, steamed with saturated steam in a star steamer for 20-30 minutes to fix the dye, rinsed, soaped, rinsed again and dried. A violet print with very good fastness properties is obtained.

Formulate of representative dyes of the foregoing examples are as follows:

Example 1

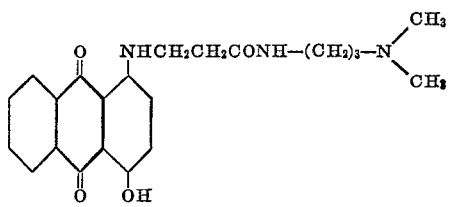

Example 2

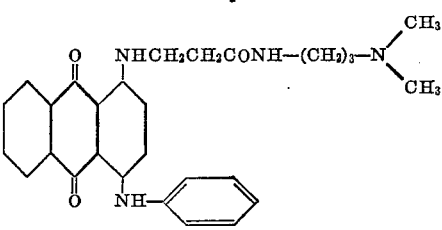

Example 9

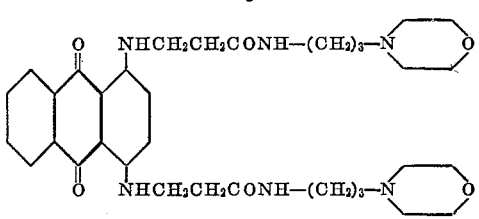

Example 35

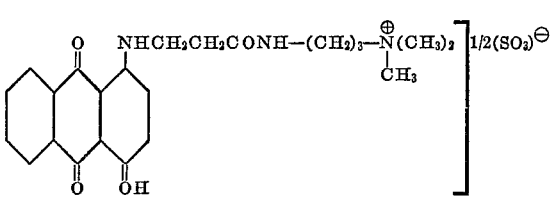

Example 36

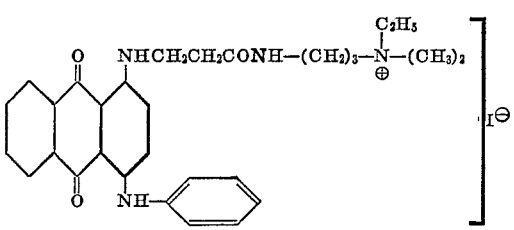

Example 42

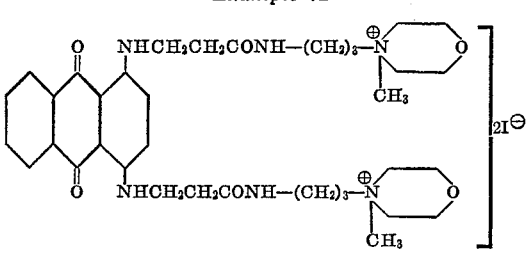

Having thus disclosed the invention what I claim is:

1. A process which comprises one of dyeing, padding and printing a member selected from the group consisting of polyacrylonitrile fibers and acrylonitrile copolymer fibers with an anthraquinone dye having directly bound to at least one α-carbon of the anthraquinone nucleus in its molecular structure a substituent of the formula

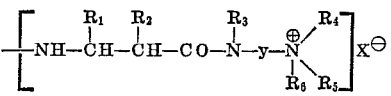

wherein:
one of $R_1$ and $R_2$ is a hydrogen atom, and the other of $R_1$ and $R_2$ is a member selected from the group consisting of a hydrogen atom and methyl,
$R_3$ represents a member selected from the group consisting of a hydrogen atom and low-molecular alkyl radicals,
$R_4$ represents a member selected from the group consisting of alkyl, cycloalkyl and aralkyl radicals,
$R_5$ represents a member selected from the group consisting of alkyl, cycloalkyl and aralkyl radicals,
$R_6$ represents a member selected from the group consisting of a hydrogen atom, alkyl, cycloalkyl and aralkyl radicals,
$y$ represents a member selected from the group consisting of a methylene and a phenylene group, and a divalent and a trivalent organic radical bound through the cited methylene and phenylene group to the adjacent N-atom,
$X^{\ominus}$ denotes an anion equivalent to the dye cation,
and the radicals $R_4$ and $R_5$ together with the adjacent N-atom alternatively represent a heterocyclic ring system,
and the radicals $R_4$, $R_5$ and $R_6$ together with the adjacent N-atom alternatively represent a heterocyclic aromatic ring system.

2. A process according to claim 1 in which the anthraquinone dye is of the formula

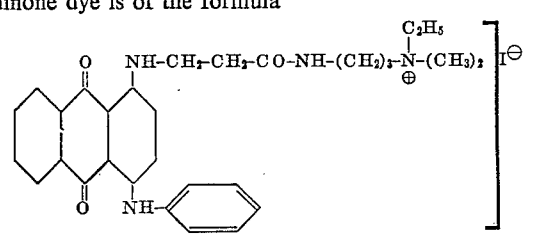

3. A process according to claim 1 in which the anthraquinone dye is of the formula

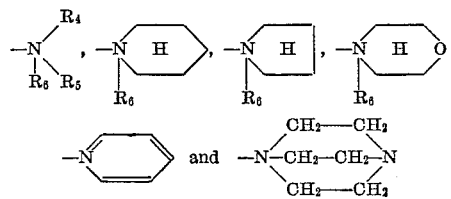

4. A process according to claim 1 in which the anthraquinone dye is of the formula

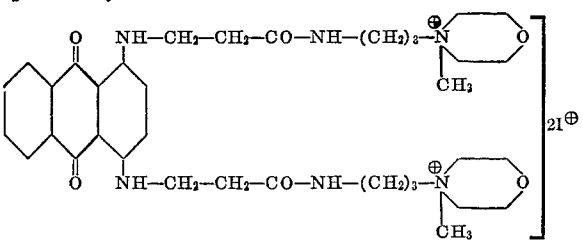

5. In the dyeing of acrylonitrile fiber with an anthraquinone dyestuff, the improvement wherein the dyestuff structure bears in at least one α-position of the anthraquinone nucleus a substituent of the formula $$-B^{\oplus}\ X^{\ominus}$$

wherein:
B is

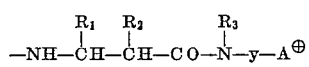

each of $R_1$ and $R_2$ is a member selected from the group consisting of a hydrogen atom and methyl, at least one of $R_1$ and $R_2$ being a hydrogen atom;
$R_3$ is a member selected from the group consisting of a hydrogen atom and lower alkyl;
$y$ is a member selected from the group consisting of lower alkylene having from 1 to 6 carbon atoms, paraphenylene, —CH$_2$—CHOH—,

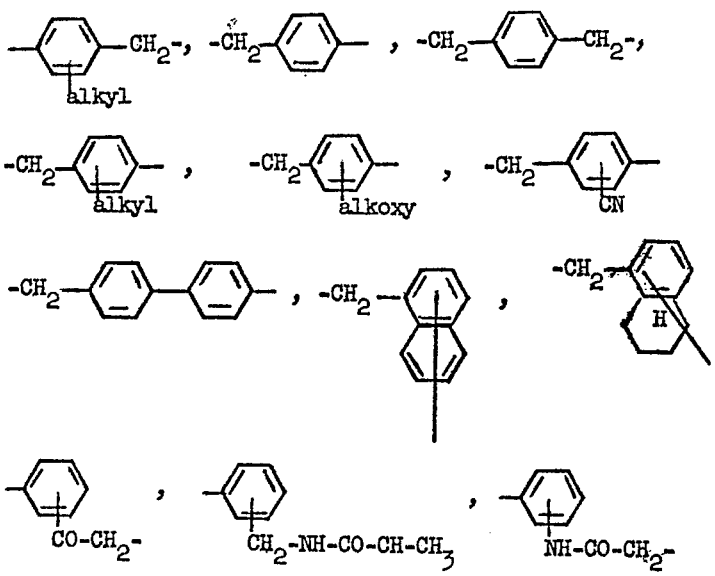

—C$_2$H$_4$—O—CO—CH$_2$—
—(CH$_2$)$_p$—O—(CH$_2$)$_q$—
—(CH$_2$)$_p$—NH—(CH$_2$)$_q$—
and —CH$_2$—NH—CO—CH$_2$—;
each of $p$ and $q$ is, independently, an integer from 1 to 6, inclusive;
A is a member selected from the group consisting of each of $R_4$, $R_5$ and $R_6$ is, independently, a member selected from the group consisting of lower alkyl and hydroxy(lower)alkyl; and X is an anion equivalent to the dye cation.

6. In the padding of acrylonitrile fiber with an anthraquinone dyestuff, the improvement wherein the dyestuff structure is free from carboxylic acid and sulfonic acid groups and bears in at least one α-position a substituent of the formula

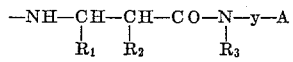

wherein:
each of $R_1$, $R_2$ and $R_3$ is a member selected from the group consisting of a hydrogen atom and lower alkyl, at most one of $R_1$ and $R_2$ being lower alkyl;
$y$ is a divalent hydrocarbon bridge member;
A is a member selected from the group consisting of

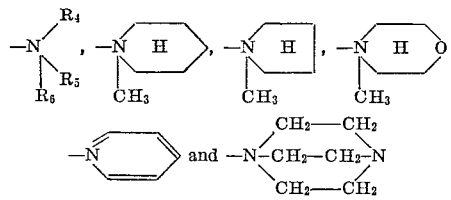

each of $R_4$, $R_5$ $R_6$ is, independently, a member from the group consisting of lower alkyl and hydroxy(lower) alkyl.

7. In the printing of acrylonitrile fiber, the acrylonitrile content of which is at least 80 percent, with an anthraquinone dyestuff, the improvement wherein the anthraquinone dyestuff is one of the formula

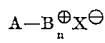

wherein:
A is an anthraquinone radical substituted in $n$ α-positions by $B^\oplus$ and in other positions by a member selected from the group consisting of a hydrogen atom, a chlorine atom, a bromine atom, an amino group, nitro, cyano, carbonamido, mercapto, phenoxy, alkoxy and alkyl groups;
B is

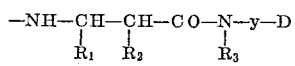

each of $R_1$ and $R_2$ is a member selected from the group consisting of a hydrogen atom and methyl, at least one of $R_1$ and $R_2$ being a hydrogen atom;
$R_3$ is a member selected from the group consisting of a hydrogen atom and a lower alkyl group;
$y$ is a divalent bridge member;
D is a member selected from the group consisting of

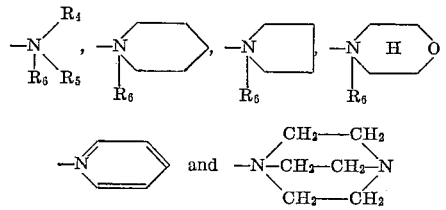

each of $R_4$ and $R_5$ is, independently, a radical selected from the group consisting of alkyl, cycloalkyl and aralkyl;
$R_6$ is a member selected from the group consisting of a hydrogen atom, alkyl, cycloalkyl and aralkyl;
$n$ is an integer from 1 to 4 inclusive; and
X is an anion equivalent to the dye cation.

8. A process which comprises one of dyeing, padding and printing of a member selected from the group consisting of polyacrylonitrile fiber and acrylonitrile copolymer fiber with an anthraquinone dye having directly bound to at least one α-carbon of the anthraquinone nucleus in its molecular structure a substituent of the formula

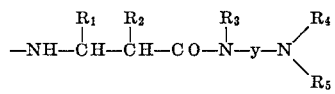

wherein:
one of $R_1$ and $R_2$ is a hydrogen atom, and the other of $R_1$ and $R_2$ is a member selected from the group consisting of a hydrogen atom and methyl;
$R_3$ is a member selected from the group consisting of a hydrogen atom and lower alkyl;
each of $R_4$ and $R_5$ is, independently, a member selected from the group consisting of alkyl, cycloalkyl and aralkyl;
$y$ is a member selected from the group consisting of a methylene and a phenylene group, and a divalent and a trivalent organic radical bound through the cited methylene and phenylene group to the adjacent N-atom; and
$R_4$ and $R_5$ together with the adjacent N-atom is, alternatively, a heterocyclic ring system.

9. A process according to claim 8 in which the anthraquinone dye is of the formula

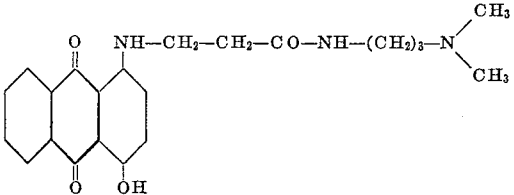

10. A process according to claim 8 in which the anthraquinone dye is of the formula

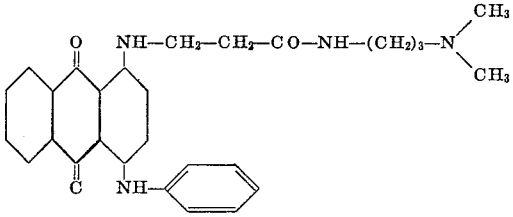

11. A process according to claim 8 in which the anthraquinone dye is of the formula

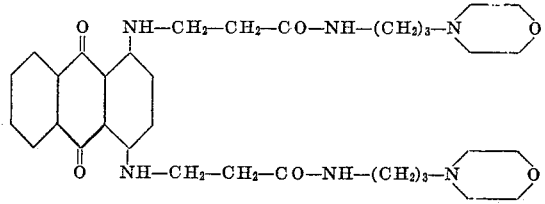

References Cited

UNITED STATES PATENTS

| | | | |
|---|---|---|---|
| 3,036,078 | 5/1962 | Grossmann et al. | 260—377 |
| 3,122,531 | 2/1964 | Atkinson et al. | |
| 3,169,822 | 2/1965 | Randall et a. | 8—1 |
| 3,242,181 | 3/1966 | Hensel et al. | 8—39 X |

J. TRAVIS BROWN, *Primary Examiner.*

T. J. HERBERT, JR., *Assistant Examiner.*

U.S. Cl. X.R.

8—55, 62; 260—377

PO-1050
(5/69)

UNITED STATES PATENT OFFICE
CERTIFICATE OF CORRECTION

Patent No. 3,418,064    Dated December 24, 1968

Inventor(s) Paul Buecheler

It is certified that error appears in the above-identified patent and that said Letters Patent are hereby corrected as shown below:

Column 2, line 45, after the final formula insert a comma --,--. Column 3, lines 13 and 14, "methylmethycrylate" should read --methylmethacrylate--; line 14, "include" should read --includes--; line 25, "printin" should read --printing--; line 41, "e.g." should read --, e.g.--; line 51, "potassium formate, oxalate" should read --potassium oxalate--; line 60, "II can" should read --II, can--; line 69, "oxidizing" should read --oxidizing--; line 70, "etc." should read --, etc.--. Column 4, line 69, "HN-" should read --HN- --
 |                        |
 $R_3$                    $R_3$ Column 8, line 59, in Example No. 7 "$F^1$" should read --$F_1$--. Column 11, lines 28 to 69, "$\overset{\oplus}{X}\ominus$" (each occurrence) should read -- $\overset{\oplus}{X}\phantom{}^{\ominus}$--.

Column 15, line 1, "example" should read --Example--; line 23, "example" should read --Example--; line 34, "600" should read --60°--; line 42, "dyeing example" should read --Dyeing Example--; line 56, "example" should read --Example--; line 60, "dyeing example" should read --Dyeing Example--; line 74, "Formulate" should read --Formulae--. Claim 1, line 2, "printing" should read --printing of--. Claim 2, line 3; in the formula "NH" should read --NH--.
 ||                |

Claim 5, at the end of each of lines 18, 19, 20, 21 and 22, insert a comma --,--; line 23, "$(CH_2)_q$" should read --$(CH_2)_q$- --; at the end of line 28, insert a comma --,--. Claim 6, line 13, after the final formula insert a comma --,--; line 15, "$R_5$" should read --$R_5$ and--. Claim 7, line 22, after the final formula insert a comma --,--.

SIGNED AND
SEALED

MAR 24 1970

(SEAL)
Attest:

Edward M. Fletcher, Jr.                    WILLIAM E. SCHUYLER, JR